(12) United States Patent
Thompson

(10) Patent No.: US 6,715,809 B2
(45) Date of Patent: Apr. 6, 2004

(54) REMOTE ATTACHABLE/REMOTE RELEASABLE HOOK

(76) Inventor: Morgan Thompson, 308 E. Marshall St., Ithaca, NY (US) 14850

( * ) Notice: Subject to any disclaimer, the term of this patent is extended or adjusted under 35 U.S.C. 154(b) by 1 day.

(21) Appl. No.: 10/219,973

(22) Filed: Aug. 15, 2002

(65) Prior Publication Data

US 2004/0032135 A1 Feb. 19, 2004

(51) Int. Cl.⁷ .................................................. B66C 1/14
(52) U.S. Cl. .................... 294/82.1; 294/1.1; 294/82.11; 294/82.24
(58) Field of Search ............................... 294/1.1, 82.1, 294/82.11, 82.14, 82.17, 82.24; 114/294, 299

(56) References Cited

U.S. PATENT DOCUMENTS

| | | | |
|---|---|---|---|
| 2,381,531 A | 8/1945 | Ehmann | 294/74 |
| 2,867,026 A | 1/1959 | Gale | 24/230.5 |
| 2,987,028 A | 6/1961 | Fair | 114/208 |
| 3,652,116 A | * 3/1972 | Pruitt | 294/82.11 |
| 3,709,548 A | * 1/1973 | Hogshead | 294/74 |
| 3,789,464 A | * 2/1974 | Collanus | 24/68 CT |
| 4,763,943 A | * 8/1988 | Melvin | 294/82.13 |
| 4,785,758 A | * 11/1988 | Eichelberger, Sr. | 114/299 |
| 5,340,085 A | 8/1994 | Keibler | 254/266 |
| 5,704,669 A | 1/1998 | Clark | 294/19.1 |

OTHER PUBLICATIONS

Beranek G.F. "The Fundamentals of General Tree Work". 1996, Beranek Publications, Fort Bragg, CA. p. 102.

* cited by examiner

*Primary Examiner*—Dean J. Kramer
(74) *Attorney, Agent, or Firm*—Brown & Michaels, PC

(57) ABSTRACT

A remote attachable/remote releasable hook apparatus comprises a hollow braid rope or cable, a tail having unidirectional properties, wherein the tail preferably includes a leaf chain or roller chain threaded or braided through the hollow braid rope or cable, and a hook assembly attached to the tail, wherein the hook assembly preferably includes a C-shaped hook having rounded outside edges and a middle leg attached to the C-shaped hook.

14 Claims, 5 Drawing Sheets

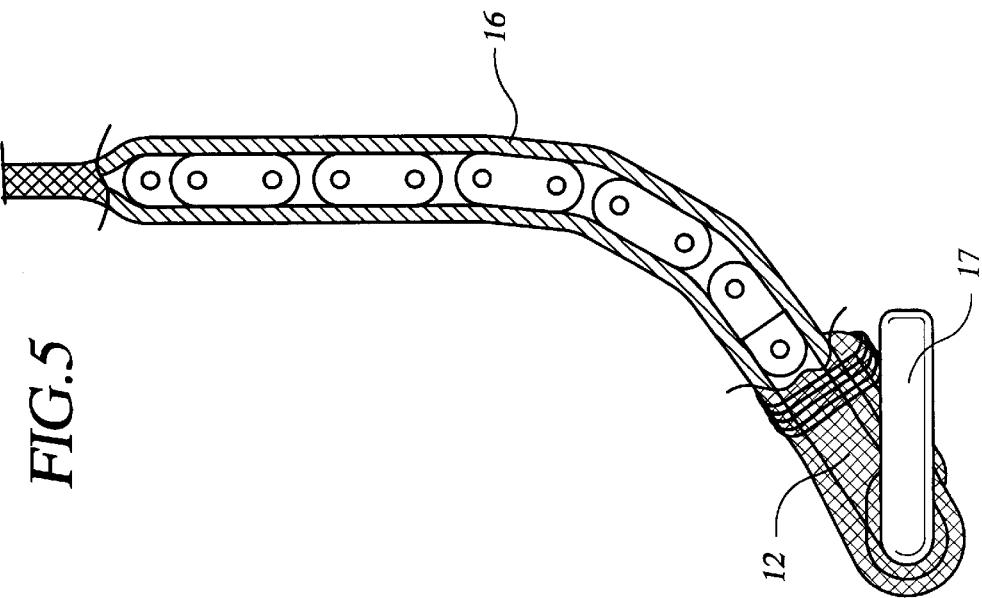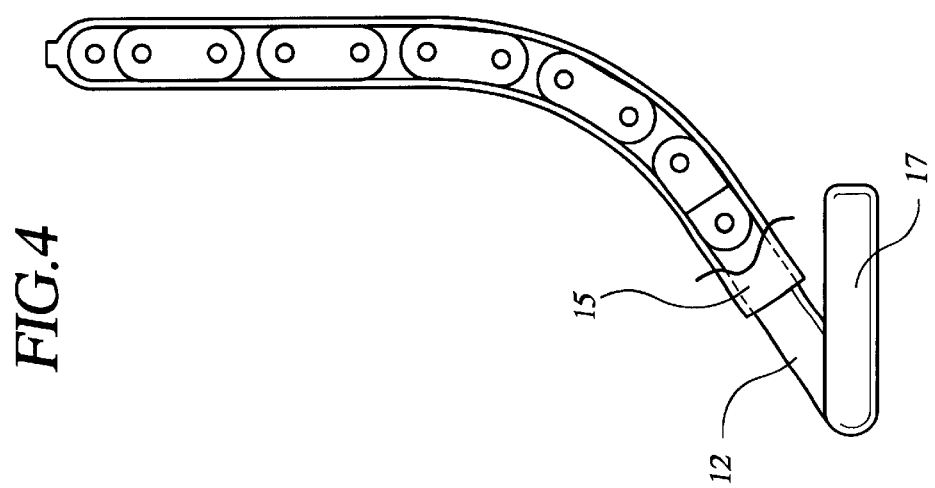

REMOTE ATTACHABLE/REMOTE RELEASABLE HOOK

BACKGROUND OF THE INVENTION

1. Field of the Invention

The invention pertains to methods and apparatus for placing a rope or cable in a remote location. More particularly, the invention pertains to a remote attachable, remote releasable hook apparatus for placing, securing, and removing a rope or cable from a remote location.

2. Description of Related Art

Placing a rope around objects in remote locations, such as, for example, I-beams or tree limbs, can be frustrating and potentially dangerous. Typically, one secures some type of rope or cable to the limb or I-beam, and then removes the rope after the job is finished. Depending on how high the remote location is, a ladder may not be high enough or stable enough to accomplish the task of placing and then removing the rope or cable. One common solution is to use lines having one end with a weighted bag that is thrown over the remote object. However, this method of placing a rope is relatively inaccurate and generally takes practice to master.

Another solution, often used by arborists, includes a shot release system, similar to a sling shot, wherein a rope having a weight at one end is loaded into a sling shot-like device and fired aiming slightly above the tree limb on which the rope needs to be placed. A line reel then can be used to retrieve the rope, similar to a reel used by a fisherman to retrieve a fish.

A third example of how a rope can be placed on a remote limb includes using a hoist line placing device with a support cable assembly, as shown in U.S. Pat. No. 5,704,669, whereby the hoist line placing device includes a telescopic, tubular pole, through which the hoist line is threaded, the line having one end with a running loop collar, and the other end of the line being stored on a spool. The user positions the pole over the limb, and the line hangs down until the running loop collar can be fastened to the line, using a downward movement, so that the line tightens around the limb.

Another problem associated with high remote locations is keeping the rope or cable securely fastened to the limb. One solution to this problem is to use a sliding hook, as disclosed in U.S. Pat. No. 2,381,531. The sliding hook captures a rope in order to secure an object for lifting.

Another solution, as shown in U.S. Pat. No. 2,867,026, is to use a sliding hook that is adapted to be set in certain positions on the rope, in order to secure the hook to the remaining end of the rope containing an eye or loop hole, for the purpose of capturing and lifting an object.

Another solution is to use a cable means that includes a choke-grip, which causes the cable to tighten around the object, where the choke-grip includes a sliding hook, which engages a loop on an end of a chain, as disclosed in U.S. Pat. No. 5,340,085.

Another solution is to use a throwing hook, which consists of a slip hook on an end of a rope, that can be set over a remote limb of a tree, as found in *The Fundamentals of General Tree Work* by G. F. Beranek.

In addition, U.S. Pat. No. 2,987,028 discloses an E-shaped hook having three outwardly-extending flukes, with the center fluke being pivotable and attached to a chain.

SUMMARY OF THE INVENTION

Briefly stated, a remote attachable/remote releasable hook apparatus comprises a hollow braid rope or cable, a tail having unidirectional properties, wherein the tail preferably includes a leaf chain or roller chain threaded or braided through the hollow braid rope or cable, and a hook assembly attached to the tail, wherein the hook assembly preferably includes a C-shaped hook having rounded outside edges and a middle leg attached to the C-shaped hook.

In an embodiment of the invention, a method of using the apparatus to place, secure and retrieve a rope or cable from a remote limb or object, comprises the steps of coiling the rope or cable in one hand and throwing the hook assembly with the other hand, releasing the coils as the hook assembly travels up and over the remote limb or object, such that the hook assembly hangs on one side of the remote limb or object and the rope or cable hangs down the other side, sending a shockwave or rolling loop up the rope or cable, such that the rope or cable is captured by a chamber defined by the C-shaped hook and the middle leg, pulling down on the rope or cable, such that the hook assembly travels up towards the remote limb or object, securing the rope or cable and hook to the remote limb or object, and retrieving the apparatus by sending another shockwave or rolling loop up the rope, such that the rope is released from the chamber defined by the C-shaped hook and the middle leg, allowing the apparatus to be retrieved.

BRIEF DESCRIPTION OF THE DRAWING

FIG. 4 shows a side view of an embodiment of the remote attachable/remote releasable hook assembly.

FIG. 5 shows a side view of an alternative embodiment of the remote attachable/remote releasable hook assembly.

DETAILED DESCRIPTION OF THE INVENTION

A remote attachable/remote releasable hook apparatus comprises a hollow braid rope or cable, a tail having unidirectional properties, wherein the tail preferably includes a leaf chain or roller chain threaded or braided through the hollow braid rope or cable, and a hook assembly attached to the tail, wherein the hook assembly preferably includes a C-shaped hook having rounded outside edges and a middle leg attached to the C-shaped hook. While the preferred embodiment comprises a braided rope, it will be apparent to one of ordinary skill in the art that other types of ropes or cable optionally can be used.

The tail stabilizes and supports the hook, such that when the hook assembly is engaged around a limb, the center of effort of the rope caught in the hook is not in line with the center of effort of the hook. This translates into twisting force that the tail resists without the tail, the hook would twist or spin and release the rope from the hook. The tail is loaded end to end and typically is bent around an object to gain the stabilizing effect on the hook. The rope sliding along the hook creates a choke-hold on the object (e.g., tree limb) and loads the tail end to end, while the object imparts a curve to the tail. When the tail is loaded end to end but has no curve, it has no stabilizing properties, because it can spin or twist around its longitudinal axis. However, when the tail is conformed around the curve of an object in the one plane in which it can bend, it provides stability, because it can only get tighter or looser along the one plane in which it can bend. It cannot twist or move in any other plane.

Figure 1:
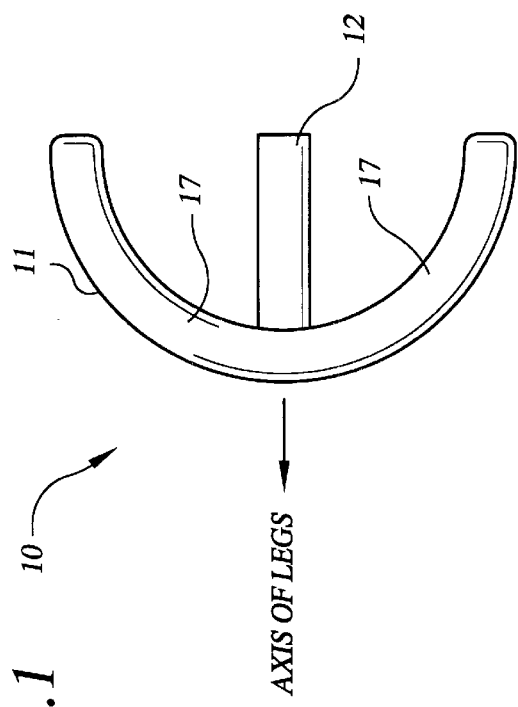
FIG. 1 shows a top view of an embodiment of the remote attachable/remote releasable hook assembly.

Referring to FIG. 1, an embodiment of the hook assembly (10) is made up of a C-shaped hook (11) having rounded outside edges. A middle leg (12) departs from the C-shaped hook (11) at an angle of about 45 degrees, making the entire hook assembly have an "E" shape. The middle leg (12) preferably is welded onto the C-shaped hook.

Figure 2:
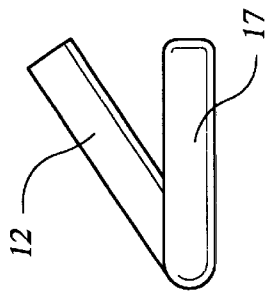
FIG. 2 shows a side view of an embodiment of the remote attachable/remote releasable hook assembly.

Referring now to FIG. 2, a side view of the hook assembly (10) is shown, wherein the 45 degree angle of the departure of the middle leg (12) is easily seen. The hook assembly (10) optionally is made of various materials, but the weight of the hook assembly (10) preferably is more than the full length of the rope (16).

Figure 3:
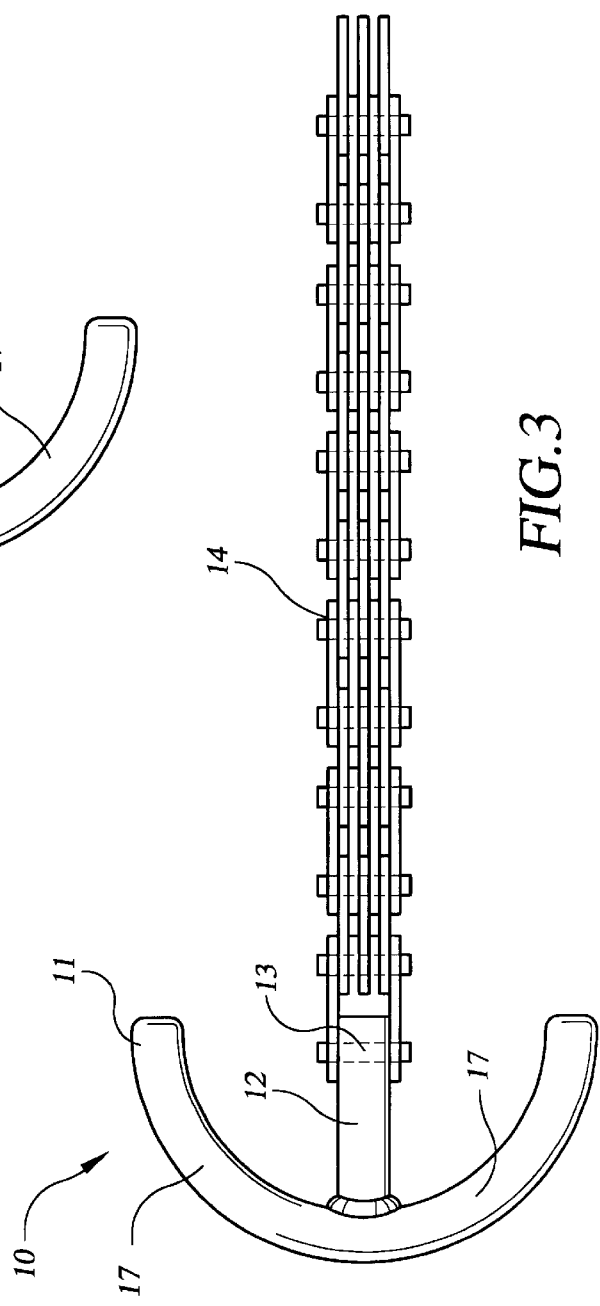
FIG. 3 shows a front view of an embodiment of the remote attachable/remote releasable hook assembly.

The tail (14) is fastened to the middle leg (12) of the hook assembly (10) by a fastener (13), preferably a rivet, as seen in FIG. 3. The tail (14) preferably comprises a leaf chain. The leaf chain has unidirectional properties in that the chain only bends in one plane, such that when the tail (14) is engaged by the hook assembly (10) around an object, such that the object imparts a curve or bend in the tail, a twisting motion will not release the rope from the hook, since the chain cannot twist. The tail preferably is covered in shrink tubing (15) to allow the tail (14), including the leaf chain, to be threaded into a hollow braid rope (16), as seen in FIG. 4 and 5.

After the rope or cable has been placed over a remote limb or object (A), the hook is then secured. To properly secure the hook, a shockwave or rolling loop is sent up the rope (16) by the user, such that it causes the rope (16) to land in a chamber (17), which is formed by the C-shaped hook (11) and the middle leg (12) of the hook assembly (10). Once the rope (16) is in one of those chambers (17), as seen in FIG. 1, the user then pulls down on the rope (16) and the hook assembly (10) slips upwards along the rope and makes a choke-grip on the remote limb (A), such that the tail conforms to the limb, thus securing the rope or cable to the remote limb (A). To retrieve the rope or cable after it has been secured to a remote limb or object (A), the user sends a shockwave or rolling loop up the rope (16), which consequently flips the rope (16) out of the chamber (17) formed by the middle leg (12) and the C-shaped hook (11).

In an alternative embodiment, a swivel optionally is placed between the tail and the rope. Optionally, the tail comprises a roller chain, which after being covered in shrink tubing, can be threaded through a double braided rope. Also optionally, one or more weights are added to the back of the tail and/or to the ends of the C-shaped hook, to improve the function of the apparatus, the added weight making placement of the apparatus easier. Furthermore, rubber tubing or rubber coating optionally is applied to the C-shaped hook. Optionally the rope is attached to the tail using a knot, splice, clamp or other suitable means known in the art.

Figure 6:
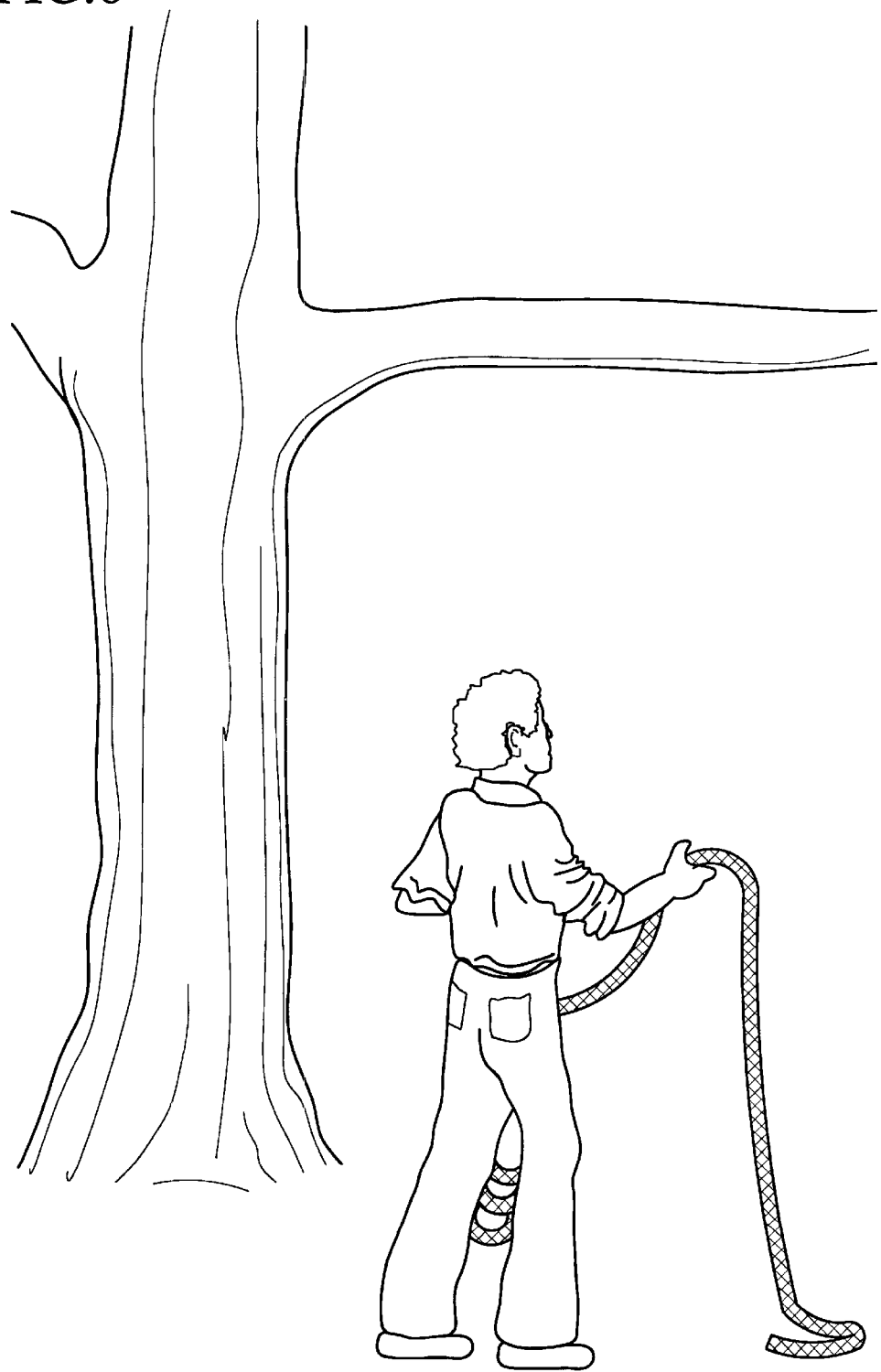
FIG. 6 shows an example of a user's placement of the remote attachable/remote releasable hook assembly.
Figure 7A:
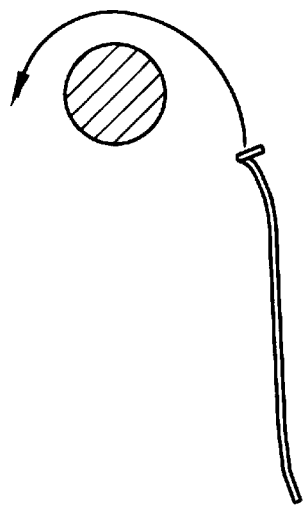
FIGS. 7A–7D show an example of the attachment sequence of the remote attachable/remote releasable hook assembly to a remote location.
Figure 7B:
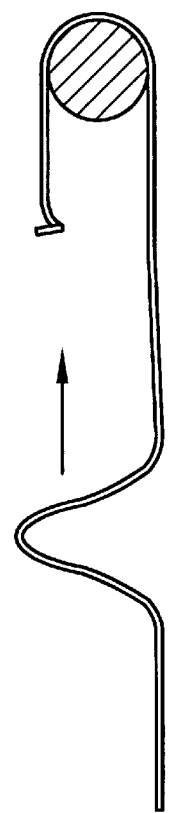
Figure 7C:
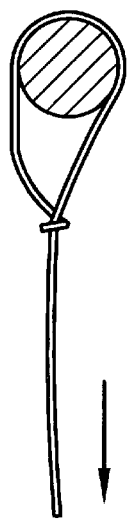
Figure 7D:
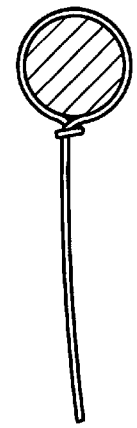
Figure 8:
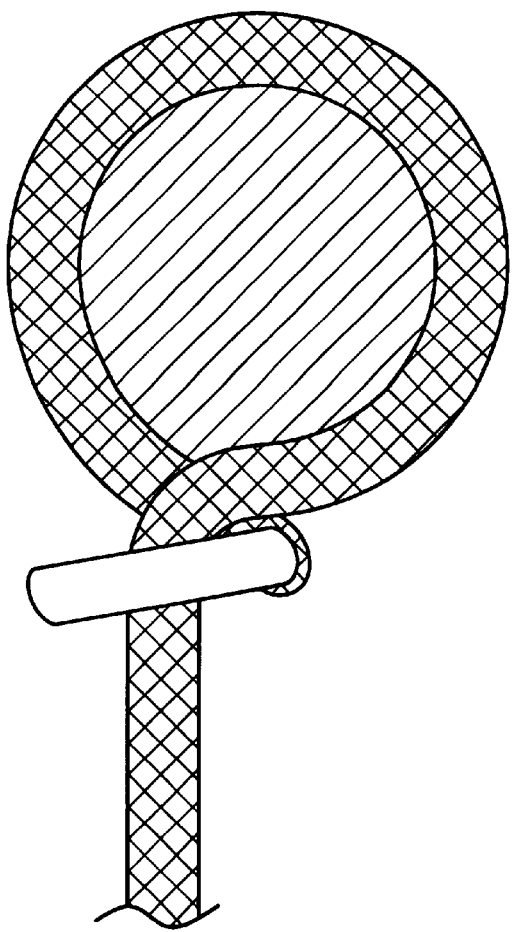
FIG. 8 shows an embodiment of the remote attachable/remote releasable hook assembly secured to a remote limb.

A preferred method of using the remote attachable/remote releasable hook assembly to place a rope around a remote tree limb or other such object (A), in which a clearance underneath the object is present and in which the object is not 45 degrees to the vertical, starts with the first step of coiling the rope (16) in one hand and throwing the hook assembly (10) with the other, releasing the coils as the hook assembly (10) travels up and over the branch, as shown in FIGS. 6 and 7a. When the rope (16) is correctly placed over the desired limb, the hook assembly (10) should hang on one side of the branch and the rope (16) on the other side of the branch near the user. The user then sends a shockwave or rolling loop up the rope (16), typically by making a brisk whipping or circular jerk motion while holding onto the rope (16), to secure the rope to the hook assembly. The shockwave or rolling loop travels up the rope (16) and around to the hook (10), causing the rope (16) to become caught in one of the chambers (17) of the "E" that is formed by a complete hook assembly (10), as shown in FIG. 7b. The user then pulls down on the rope (16), such that the rope (16) slides along the hook (10), cinching the hook up to the bottom of the branch, as shown in FIG. 7c. At this point, a visual check is necessary to make sure the hook (10) is cinched and oriented correctly, as shown in FIGS. 7d and 8. The rope (10) is now properly secured and can be used for a number of purposes. To release and retrieve the rope (16) from the hook assembly (10), the user sends a shockwave or running loop up that rope (16) that consequently flips the rope (16) out of the hook assembly (10), and the hook assembly (10) is pulled over and off of the objects or tree limbs.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A remote attachable, remote releasable hook apparatus comprising:
   a) a hollow braid rope or cable;
   b) a tail having unidirectional properties, wherein said tail is threaded or braided through said hollow braid rope or cable; and
   c) a hook assembly attached to said tail.

2. The apparatus of claim 1, wherein said hook assembly comprises a substantially C-shaped hook having rounded outside edges, and a middle leg attached to said C-shaped hook.

3. The apparatus of claim 2, wherein said middle leg is attached to said C-shaped hook at an angle of about 45 degrees.

4. The apparatus of claim 2, wherein said tail is fastened to said rope or cable using a swivel.

5. A method of using the apparatus of claim 2 to place, secure and retrieve a rope or cable from a remote limb or object, comprising the steps of:
   a) coiling the rope or cable in one hand and throwing the hook assembly with the other hand, releasing the coils as the hook assembly travels up and over the remote limb or object, such that the hook assembly hangs on one side of the remote limb or object and the rope or cable hangs down the other side;
   b) sending a shockwave or rolling loop up the rope or cable, such that the rope or cable is captured by a chamber defined by the C-shaped hook and the middle leg;
   c) pulling down on the rope or cable, such that the hook assembly travels up towards the remote limb or object, securing the rope or cable and hook to the remote limb or object; and
   d) retrieving the apparatus by sending another shockwave or rolling loop up the rope, such that the rope is released from the chamber defined by the C-shaped hook and the middle leg, allowing the apparatus to be retrieved.

6. The method of claim 5, wherein said shockwave or rolling loop is generated by a brisk whipping or circular jerking motion of said rope or cable.

7. The apparatus of claim 1, wherein said tail is covered by shrink-tubing.

8. The apparatus of claim 1, wherein said tail comprises a leaf chain or a roller chain.

9. A remote attachable, remote releasable hook apparatus comprising:
   a) a hollow braid rope or cable;
   b) a tail having unidirectional properties, wherein said tail comprises a leaf chain or roller chain threaded or braided through said hollow braid rope or cable; and
   c) a hook assembly attached to said tail, wherein said hook assembly comprises a substantially C-shaped hook having rounded outside edges, and a middle leg attached to said C-shaped hook.

10. The apparatus of claim 9, wherein said middle leg is attached to said C-shaped hook at an angle of about 45 degrees.

11. The apparatus of claim 9, wherein said tail is fastened to said rope or cable using a swivel.

12. The apparatus of claim 9, wherein said tail is covered by shrink-tubing.

13. A method of using the apparatus of claim 9 to place, secure and retrieve a rope or cable from a remote limb or object, comprising the steps of:
   a) coiling the rope or cable in one hand and throwing the hook assembly with the other hand, releasing the coils as the hook assembly travels up and over the remote limb or object, such that the hook assembly hangs on one side of the remote limb or object and the rope or cable hangs down the other side;
   b) sending a shockwave or rolling loop up the rope or cable, such that the rope or cable is captured by a chamber defined by the C-shaped hook and the middle leg;
   c) pulling down on the rope or cable, such that the hook assembly travels up towards the remote limb or object, securing the rope or cable and hook to the remote limb or object; and
   d) retrieving the apparatus by sending another shockwave or rolling loop up the rope, such that the rope is released from the chamber defined by the C-shaped hook and the middle leg, allowing the apparatus to be retrieved.

14. The method of claim 13, wherein said shockwave or rolling loop is generated by a brisk whipping or circular jerking motion of said rope or cable.

* * * * *